(12) United States Patent
Spitzer

(10) Patent No.: US 10,373,185 B1
(45) Date of Patent: Aug. 6, 2019

(54) DYNAMICALLY FINANCED CUSTOMER ENGAGEMENT CAMPAIGN

(71) Applicant: Square, Inc., San Francisco, CA (US)

(72) Inventor: Garrett Spitzer, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 718 days.

(21) Appl. No.: 14/985,191

(22) Filed: Dec. 30, 2015

(51) Int. Cl.
 *G06Q 30/00* (2012.01)
 *G06Q 30/02* (2012.01)

(52) U.S. Cl.
 CPC ..... *G06Q 30/0219* (2013.01); *G06Q 30/0213* (2013.01); *G06Q 30/0215* (2013.01); *G06Q 30/0238* (2013.01); *G06Q 30/0244* (2013.01); *G06Q 30/0247* (2013.01)

(58) Field of Classification Search
 CPC ........... G06Q 30/0219; G06Q 30/0244; G06Q 30/0247
 USPC ................................ 705/14.15, 14.17, 14.38
 See application file for complete search history.

(56) References Cited

U.S. PATENT DOCUMENTS

| | | | |
|---|---|---|---|
| 6,941,281 B1 | 9/2005 | Johnson | |
| 7,630,932 B2 * | 12/2009 | Danaher | G06Q 40/02 705/37 |
| 7,974,918 B1 | 7/2011 | Kunde et al. | |
| 8,150,762 B1 | 4/2012 | Reed | |
| 8,429,067 B1 | 4/2013 | Keller et al. | |
| 9,786,005 B1 | 10/2017 | Poursartip et al. | |
| 9,805,338 B1 | 10/2017 | Ghosn et al. | |
| 9,892,458 B1 | 2/2018 | Hearer et al. | |
| 9,984,412 B1 | 5/2018 | Poursartip et al. | |
| 10,019,698 B1 | 7/2018 | Scott et al. | |
| 2004/0225594 A1 | 11/2004 | Nolan, III et al. | |
| 2005/0192862 A1 | 9/2005 | Modi | |
| 2005/0239448 A1 * | 10/2005 | Bayne | G06Q 30/02 455/414.3 |

(Continued)

OTHER PUBLICATIONS

Non-Final Office Action dated Apr. 4, 2018, for U.S. Appl. No. 15/855,802, of Jew, W. et al., filed Dec. 27, 2017.

(Continued)

*Primary Examiner* — Luis A Brown
(74) *Attorney, Agent, or Firm* — Mattingly & Malur, PC

(57) ABSTRACT

A system and method for implementing a financed customer engagement campaign on a payment processing system, wherein the payment processing system may receive a request from a merchant to initiate a financed customer engagement campaign, costs of the financed customer engagement campaign being based on customer participation. The payment processing system may calculate participation terms and financing terms, the financing terms including repayment terms, the participation terms including a transaction redemption amount, the transaction redemption amount offsetting a discount given by the merchant for a transaction during the financed customer engagement campaign such that the actual costs of the financed customer engagement campaign are delayed for the merchant. Further, the payment processing system may process the transaction during the financed customer engagement campaign and deposit a net settlement in an account associated with the merchant based on at least a payment amount for the transaction and the transaction redemption amount.

22 Claims, 7 Drawing Sheets

(56) References Cited

U.S. PATENT DOCUMENTS

| | | | |
|---|---|---|---|
| 2008/0243569 A1 | 10/2008 | Hadden | |
| 2009/0222374 A1 | 9/2009 | Choudhuri et al. | |
| 2009/0222378 A1* | 9/2009 | Choudhuri | G06Q 40/02 705/38 |
| 2009/0313156 A1 | 12/2009 | Herr | |
| 2010/0114624 A1* | 5/2010 | Lakshminarayan | G06Q 40/00 705/35 |
| 2011/0078073 A1 | 3/2011 | Annappindi | |
| 2011/0178902 A1 | 7/2011 | Imrey et al. | |
| 2012/0005036 A1* | 1/2012 | Erickson | G06Q 30/00 705/26.2 |
| 2012/0054097 A1 | 3/2012 | Frohwein et al. | |
| 2012/0185311 A1 | 7/2012 | Tavares et al. | |
| 2012/0232974 A1* | 9/2012 | Castiglione | G06Q 30/0215 705/14.21 |
| 2012/0239552 A1 | 9/2012 | Harychi | |
| 2012/0310686 A1 | 12/2012 | Carter | |
| 2012/0330741 A1* | 12/2012 | Cruz | G06O 30/0214 705/14.31 |
| 2013/0013477 A1* | 1/2013 | Ortega | G06Q 40/00 705/35 |
| 2013/0110607 A1* | 5/2013 | Basmajian | G06Q 30/0238 705/14.26 |
| 2014/0006202 A1 | 1/2014 | Frohwein et al. | |
| 2014/0012780 A1* | 1/2014 | Sanders | G06Q 40/06 705/36 R |
| 2014/0172560 A1 | 6/2014 | Satyavolu et al. | |
| 2014/0258088 A1* | 9/2014 | Belarj | G06Q 40/025 705/38 |
| 2014/0358766 A1* | 12/2014 | Nayyar | G06Q 40/025 705/38 |
| 2015/0066635 A1* | 3/2015 | Valin | G06O 30/0207 705/14.45 |
| 2015/0106260 A1 | 4/2015 | Andrews et al. | |
| 2015/0180833 A1 | 6/2015 | Snow et al. | |
| 2015/0348083 A1 | 12/2015 | Brill et al. | |
| 2015/0371335 A1* | 12/2015 | Liptak | G06Q 40/06 705/36 R |
| 2016/0012465 A1 | 1/2016 | Sharp | |
| 2016/0086222 A1 | 3/2016 | Kurapati | |
| 2016/0189292 A1 | 6/2016 | Deshpande et al. | |
| 2017/0255793 A1 | 9/2017 | Caldwell | |
| 2018/0040064 A1 | 2/2018 | Grigg et al. | |
| 2018/0053253 A1 | 2/2018 | Gokhale et al. | |
| 2018/0150910 A1 | 5/2018 | Grech et al. | |
| 2018/0158091 A1 | 6/2018 | Ovick et al. | |
| 2018/0349990 A1 | 12/2018 | Diriye et al. | |

OTHER PUBLICATIONS

"MCM Poll Results: 72 percent of Mobile Food Vendor only accept cash," Mobile Cuisine Magazine, accessed at http://web.archive.org/web/201104 23204019/mobile-cuisine.com/features/mcm-poll-results-72-percent -of-mobile-rood-vendors-only-accept -cash/, pp. 2 (Jan. 25, 2011).

Non-Final Office Action dated Sep. 4, 2018, for U.S. Appl. No. 16/024,140, of Masoni, J.I.S.C, et al., filed Jun. 29, 2018.

Final Office Action dated Nov. 19, 2018, for U.S. Appl. No. 15/855,802, of Jew et al., filed Dec. 27, 2017.

Final Office Action dated Jan. 11, 2019, for U.S. Appl. No. 16/024,140, of Masoni, J.I.S.C., et al., filed Jun. 29, 2018.

Advisory Action dated Feb. 8, 2019, for U.S. Appl. No. 15/855,802, of Jew, W., et al., filed Dec. 27, 2017.

* cited by examiner

DYNAMICALLY FINANCED CUSTOMER ENGAGEMENT CAMPAIGN

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. The mobile computing device then transmits the payment card information and other transaction information to a payment processing system to be processed. Typically, this information is transmitted over an internet connection or stored for later batch transmission if an internet connection is not available.

A merchant using a mobile payment system may desire to increase the merchant's sales volume by engaging customers by using incentives. However, the merchant may not have the resources or capital to implement such a customer engagement campaign. For example, a customer engagement campaign may be beneficial to a merchant, but the cost of implementing the customer engagement campaign may be prohibitive.

BRIEF DESCRIPTION OF THE DRAWINGS

The techniques described herein are illustrated by way of example, and not by way of limitation, in the figures of the accompanying drawings, in which like reference numerals are used to refer to similar elements.

Figure 1:
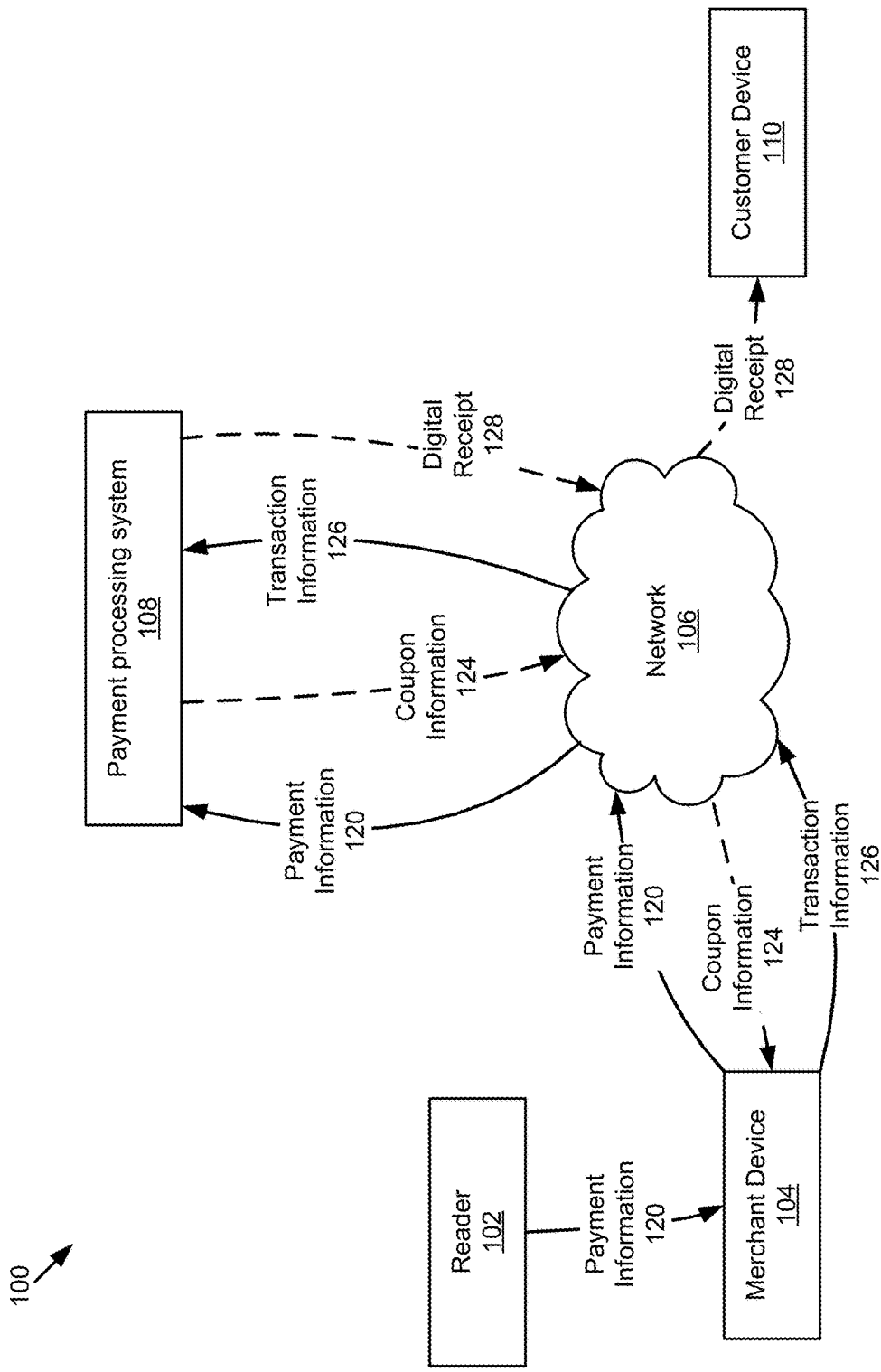
FIG. 1 is a data flow diagram depicting an example data flow among a reader device, a merchant device, a payment processing system, and a customer device for implementing a customer engagement campaign.

The figures depict various implementations of the techniques described herein for purposes of illustration only. It should be readily recognized from the following discussion that alternative implementations of the structures and methods illustrated herein may be employed without departing from the principles of the techniques described herein.

DETAILED DESCRIPTION

Various implementations of the techniques introduced herein are discussed in detail below. While specific implementations are discussed, it should be understood that this is done for illustration purposes only. It will be recognized that other components and configurations may be used without departing from the spirit and scope of the techniques introduced herein.

Systems and methods in accordance with various implementations of the techniques described in the present disclosure overcome one or more of the above-referenced and other deficiencies in conventional approaches to implementing and financing a customer engagement campaign. The techniques may provide for the distribution, use, and tracking of physical or virtual coupons as well as the calculation of financing to compensate a merchant for discounts related to redeemed coupons as part of a financed customer engagement campaign. In particular, the techniques described herein spread out the cost of a financed customer engagement campaign through incremental dynamically determined distribution of financing. For example, the techniques described herein provide for a system and method to implement a financed customer engagement campaign by determining eligibility of a merchant to receive financing based on the merchant's past interaction with a payment processing system and calculating participation and financing terms to spread out the cost of the financed customer engagement campaign. The financed customer engagement campaign is further implemented by providing discounts to customers while financing incremental amounts to cover the cost of the discounts and collecting repayment from the merchant.

In an example implementation, the owner of a coffee shop desires to spend $1000 on a financed customer engagement campaign to encourage more customers to purchase coffee from the coffee shop over the month of January, however the owner is concerned that a $1000 drop in revenue during January would be too expensive financially. The owner of the coffee shop may send a request to the payment processing system that processes the shop's transactions to initiate and receive financing for the financed customer engagement campaign. The payment processing system evaluates a financial history of the merchant, calculates participation and financing terms for the financed customer engagement campaign, and may assist the merchant in providing coupons as part of the financed customer engagement campaign.

For example, the payment processing system may determine that the merchant is eligible to receive financing for up to 1000 one dollar coupons to its customers. In order to avoid the scenario in which the coffee shop loses all or most of the $1000 in revenue over a short time period, the payment processing system calculates and then provides a loan or cash advance to the coffee shop to cover the discount from each coupon as the coupon is redeemed. Additionally, the payment processing system may determine, based on the coffee shop's past transactions that, in order to repay the financing to the merchant for the redeemed coupons and the financing fee, the payment processing system will withhold 5% from transactions processed by the payment processing system from January through October, or sooner if the amount is repaid more quickly than anticipated.

Financed funds are distributed to the merchant as each coupon is redeemed, so the amount of financing is capped at the actual costs of the financed customer engagement campaign.

Additionally, the techniques described herein provide for a system in which coupons and financing can be evaluated individually. For example, if the coffee shop owner, as part of the financed customer engagement campaign, elects to send the 1000 coupons to 1000 customers known to the payment processing system to be coffee drinkers, the coupons may be sent to the customers via e-mail and linked to payment cards of the customers. As a consequence, a customer who received a coupon may purchase a coffee from the coffee shop using only the payment card to which the coupon is linked and the payment processing system could automatically find and apply the coupon so that the customer receives the discount. Moreover, the payment processing system can recognize that the coupon has been redeemed and provide financed funds to compensate the merchant for the coupon. As a result, the customer is incentivized to purchase coffee from the coffee shop, but the merchant does not see an immediate decrease in revenue due to the discount. Rather the effect of the discount is spread over many transactions processed by the payment processing system for the merchant.

FIG. 1 is a data flow diagram depicting an example data flow 100 among a payment card reader device 102, a merchant device 104, a payment processing system 108, and a customer device 110 according to one implementation. The payment card reader 102 and the merchant device 104 form a POS terminal capable of receiving input including payment information. The merchant device 104 may be a mobile computing device, as described elsewhere herein, and the payment card reader 102 may include a device that is separate from or integrated into the merchant device 104 that is capable of receiving a payment card swipe (or other payment card interaction).

In the example of FIG. 1, the merchant device 104 communicates with the reader 102, to receive payment information 120 for a POS transaction. The payment information 120 may include information capable of identifying a payment method (e.g., credit card number) of the customer to the payment processing system 108. The reader may receive the payment information 120 from a customer's payment card, which may include a magnetic strip swiped in a magnetic strip reader of the payment card reader 102, an integrated circuit enabled payment card read by an integrated circuit card reader of the payment card reader 102, a near field communication (NFC) enabled physical or digital payment card (e.g., Apple Pay™, Google Wallet™, etc.) interacting with a radio of the reader 102, etc. In some instances, the payment information 120 may be communicated directly between a physical payment card or digital payment card on a customer device and the merchant device 104.

The merchant device 104 transmits payment information 120 via the network 106 to the payment processing system 108, which receives the payment information 120 and uses it to identify the customer and determine whether the customer has, or is eligible for, a virtual coupon (e.g., a coupon may include any incentive or discount given to a customer). For example, a virtual coupon may be linked to the customer's payment card, e-mail address, phone number, customer account, etc. In some instances, even if a virtual coupon is not linked to the customer's identity, the customer may still be eligible to receive a financed discount according to the techniques described herein, for example, if the customer presents a physical coupon at the point of sale, if the financed customer engagement campaign does not need a coupon to be redeemed, etc. In some implementations, the payment processing system 108 may determine whether or not the coupon is part of a financed customer engagement campaign.

The payment processing system 108 may identify the customer based on the payment information 120, for example, based on a credit card number associated with the payment card. The payment processing system 108 determines whether the customer has a customer profile. In some instances, a customer profile is automatically created when a customer uses a payment card for the first time, at which point the payment processing system 108, via the merchant device 104 at the POS transaction, may augment the profile by requesting additional information from the customer, such as an e-mail address, telephone number, account number, etc. In some implementations, the payment processing system 108 may identify the customer based on contact information previously provided by the customer, for example, the customer may enter contact information at the POS terminal, which is transmitted to the payment processing system 108 to determine whether a coupon is associated with that customer.

The payment processing system 108 may transmit coupon information 124 to the merchant device 104 indicating whether the customer has a coupon, the details of the coupon, the validity of the coupon, etc. The merchant device 104 may indicate to the customer that a coupon may be applied to the transactions, for example, as illustrated in FIG. 2.

Figure 2:
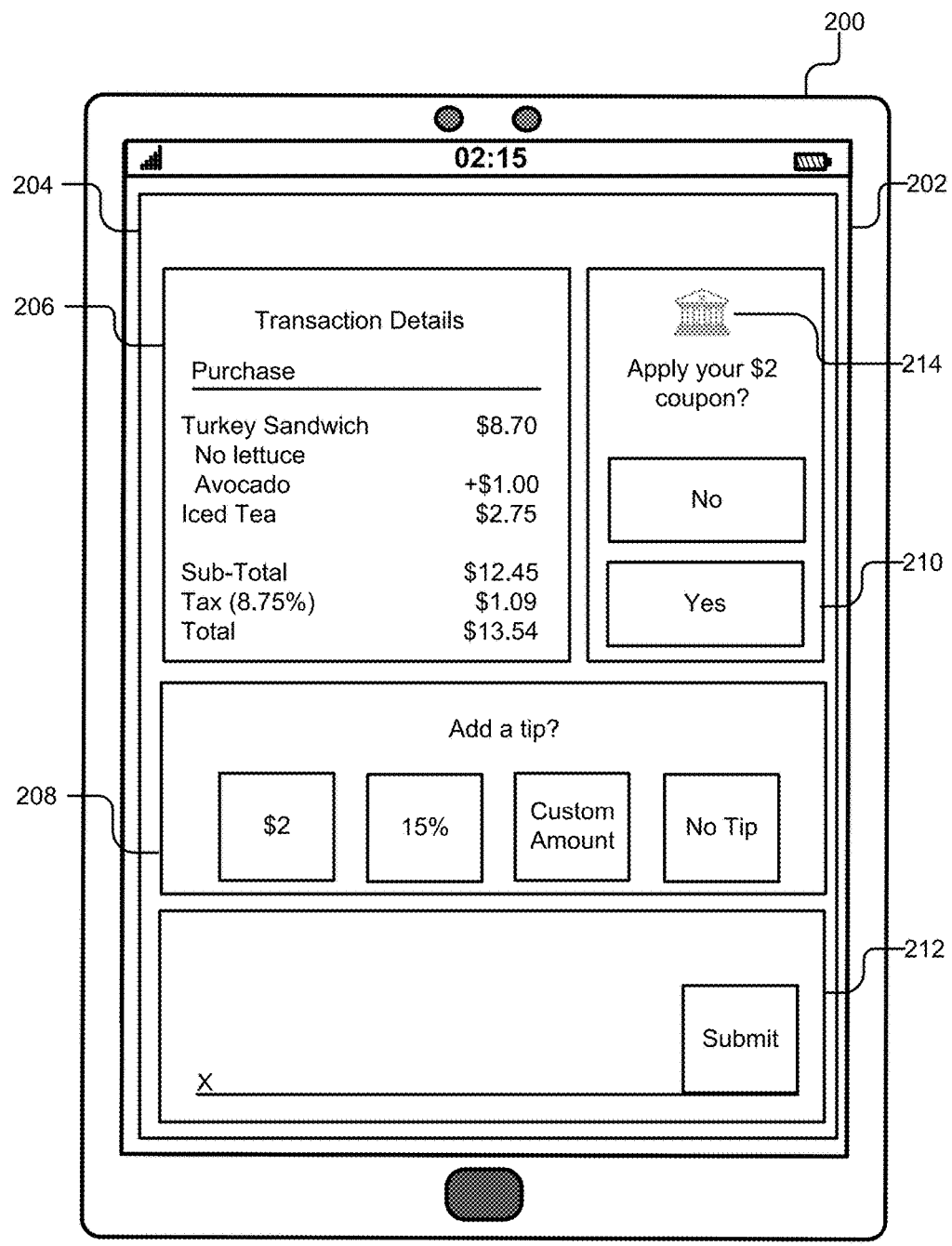
FIG. 2-3 illustrate implementations of graphical user interfaces configured to allow a user to apply a virtual coupon on a user device.

FIG. 2 illustrates an implementation of a graphical user interface 204 implemented on a user device 200. As used herein, the term "user device" refers to any general-purpose computing device capable of data processing, such as a merchant device 104 or a customer device 110. In one example, the user device can be a mobile device, such as a smartphone, a personal digital assistant, a tablet, an e-reader, wearable device, or other mobile or portable computing devices. In another example, the user device can be a personal computing device, such as a desktop, a laptop, or other wired and wireless personal computers. The user device 200 is equipped with a display screen 202 for displaying various user interfaces, including the graphical user interface 204, to enable a user to interact with content generated by the user device 200.

The graphical user interface 204 illustrated in FIG. 2 may be displayed to a customer after the customer has entered payment information (e.g., swiped a payment card) in order to confirm the transaction and request a signature. The graphical user interface 204 displays, in real time, one or more features for the merchant, the customer, and the payment processing system to interact or engage with one another.

The user device 200 can implement an application, such as a register application for use by a merchant. The register application may include various interface components including a transaction detail feature 206, a gratuity feature 208, a coupon feature 210, and a signature feature 212. The transaction detail feature 206 displays details pertaining to the transaction, such as the name of the items purchased, the quantity, the price, or the like. The transaction detail feature may also, or alternatively, include an overview of the transaction completed between the customer and the merchant, the payment card used for the transaction (e.g., last four digits of a credit card), the date, or the like. The gratuity feature 208 allows a user to add a gratuity to the transaction. The signature feature 212 receives a signature input from a customer to authorize that the customer's payment method be charged a transaction amount.

The coupon feature 210 indicates coupon details for the transaction, for example, whether a coupon has been applied to the transaction or may be applied to the transaction. In some instances, the coupon feature 210 may indicate whether a virtual coupon associated with the customer may be applied to the current transaction and may allow the customer to select whether or not to apply the coupon. In some instances, the coupon feature 210 includes a financed coupon indicator 214 that indicates that a coupon is a part of a financed customer engagement campaign. The financed coupon indicator 214 indicates to the merchant that, although the customer is receiving a discount, the merchant will receive financed funds from the payment processing system 108 to cover the discount.

Figure 3:
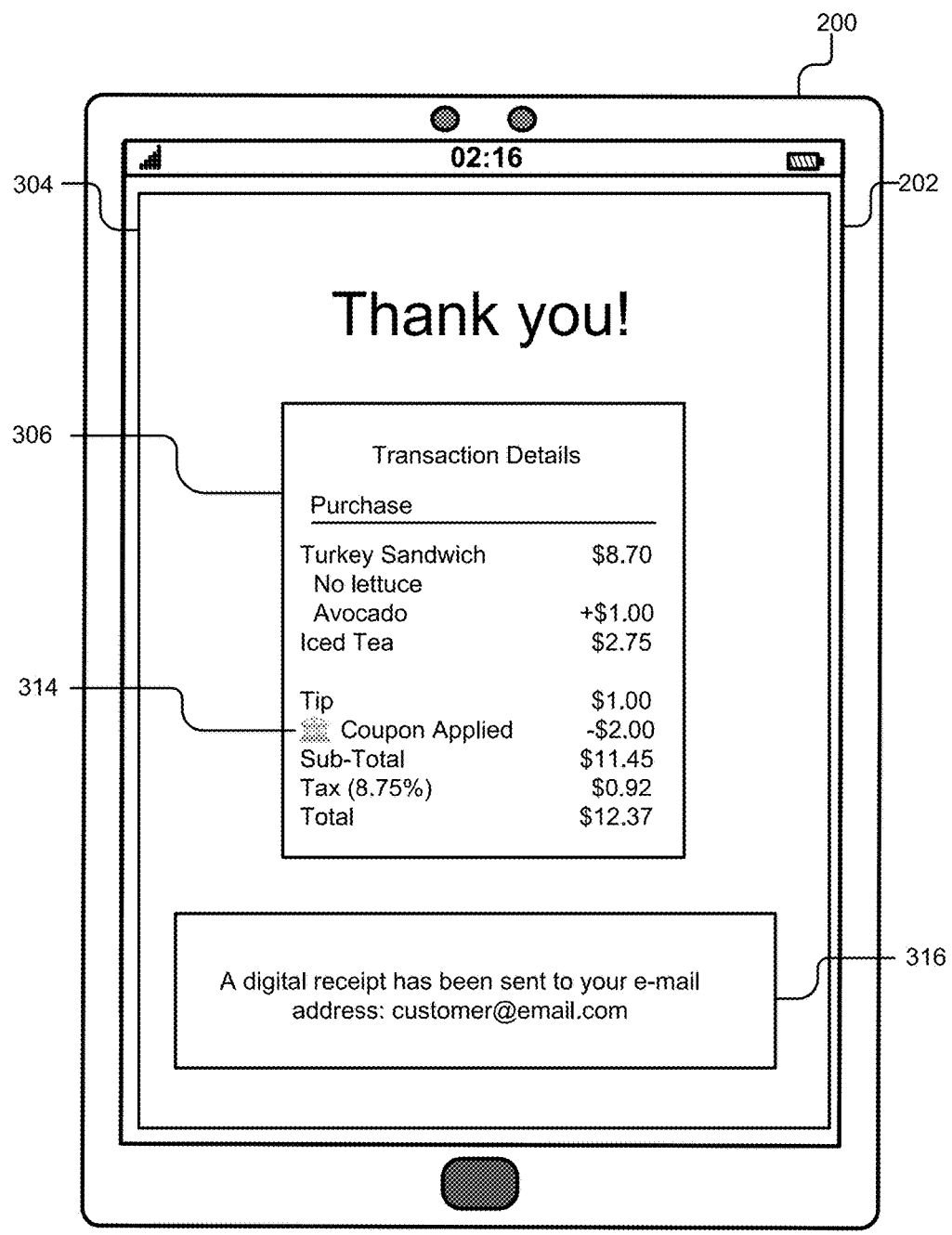

FIG. 3 illustrates an implementation of a graphical user interface 304 implemented on a user device 200. The graphical user interface 304 illustrated in FIG. 3 would typically be displayed to a customer after the customer has confirmed the transaction, as in FIG. 2 (before or after the payment has been processed, depending on the implementation). The graphical user interface 304 may be implemented on a register application on the user device 200. The graphical user interface 304 may include various interface components including a receipt detail feature 306 that indicates final details pertaining to the transaction (e.g., similar to the transaction detail feature 206). The receipt detail feature 306 may indicate final amounts charged to the customer's payment card and may also display that a coupon has been applied. In some implementations, the receipt detail feature 306 may also include a financed coupon indicator 314 that indicates whether a coupon is part of a financed customer engagement campaign. In some instances, the graphical user interface 304 may also include a sent receipt confirmation feature 316 that indicates that a digital receipt was sent to the customer.

Returning to FIG. 1, the merchant device 104 transmits transaction information 126 via the network 106 to the payment processing system 108, which receives and stores the transaction information 126. The transaction information may include information regarding the time, place, and the amount of each respective transaction, information related to the item or service acquired, payment information, whether and what coupons were applied to the transaction, as well as additional information, such as customer information. In some instances, the payment processing system 108 may store information about the transactions entered into by the merchant in the merchant profile and/or the customer profile, such as the transaction amounts, customers, merchant attributes, products, locations, etc.

After receiving the transaction information 126, the payment processing system 108 may process the payment for the transaction by determining whether a coupon was applied to the transaction as part of the financed customer engagement campaign and charging the payment card with the appropriate amount (e.g., discounted payment plus any taxes, gratuity, etc.). For example, if a coupon was applied to the transaction the customer would be charged the discounted amount, but the merchant would still be credited the total amount as if no discount was applied. The total amount credited to the merchant would include a payment amount charged to the customer as well as a transaction redemption amount. The transaction redemption amount is an amount of financed funds provided to the merchant by the payment processing system to mitigate the financial loss to the merchant due to the discount of the transaction. The transaction redemption amount and the ways in which it is calculated for the financed customer engagement campaign and the specific transaction are described in more detail in reference to FIG. 4.

The payment processing system 108 charges the payment card and distributes the funds to the merchant. The payment processing system 108 may generate a digital receipt and transmit the digital receipt 128 via the network 106 to the customer device 110 for display to the customer in an e-mail program, text message, receipt application, or other means capable of displaying the digital receipt. For example, after the customer has tendered his credit card to the merchant to pay for a product, a digital receipt is generated and sent to the customer's user device (e.g., the customer device 110) for display to the customer.

Figure 4:
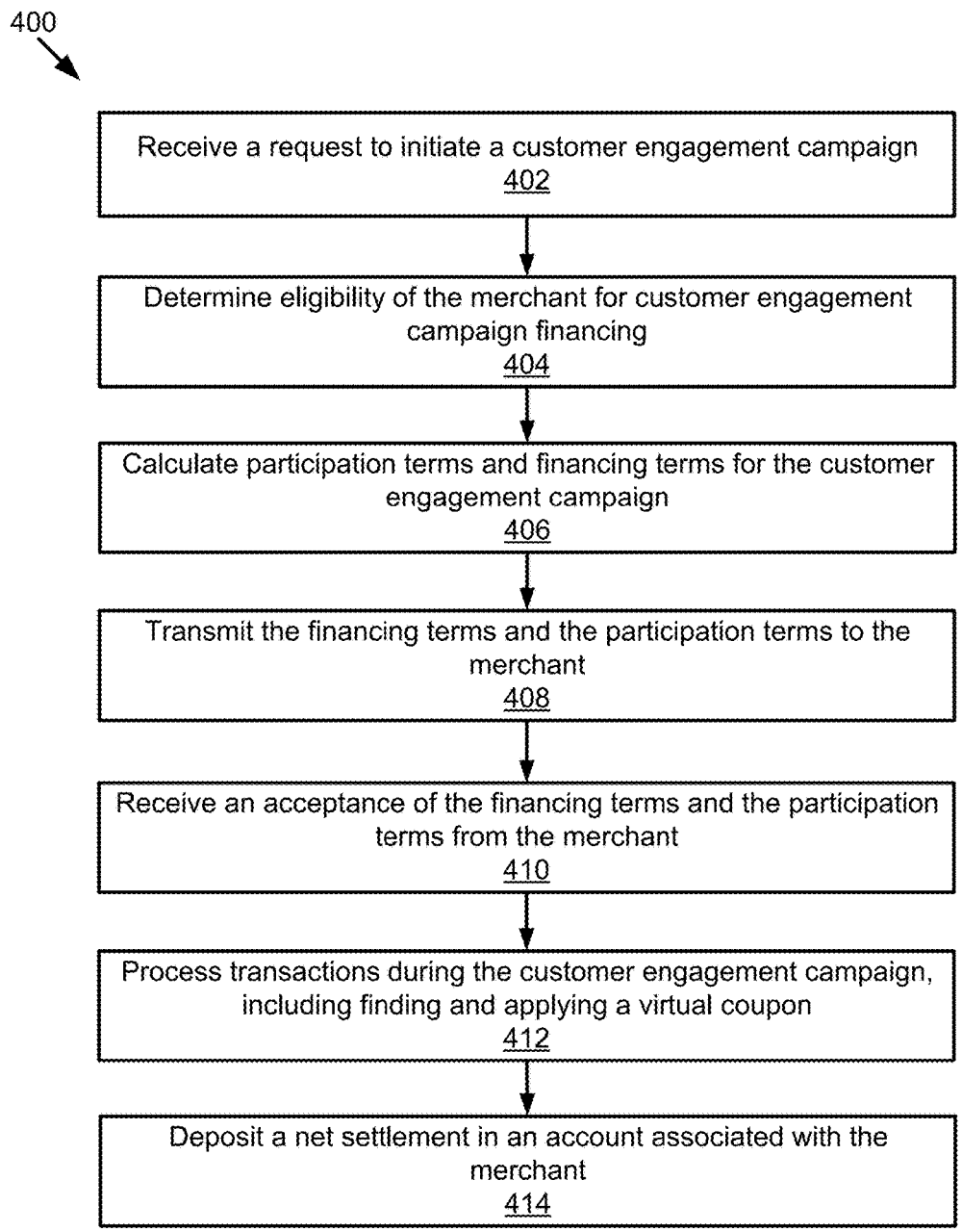
FIG. 4 is a flow diagram illustrating an example process for implementing a financed customer engagement campaign.

FIG. 4 is a flow diagram illustrating an example process 400 for enabling financing to a merchant of a POS transaction in a financed customer engagement campaign according to one implementation. The processes described in FIG. 4 are illustrated as a collection of blocks in a logical flow diagram, which represents a sequence of operations, some or all of which can be implemented in hardware, software, or a combination thereof. The order in which the blocks are described should not be construed as a limitation. Any number of the described blocks can be combined in any order and/or performed in parallel to implement the processes, and not all of the blocks need be executed. For ease of description, the processes are described with reference to the environments, architectures, and systems described in the examples herein, although the processes may be implemented in a wide variety of other environments, architectures, and systems.

Figure 5:
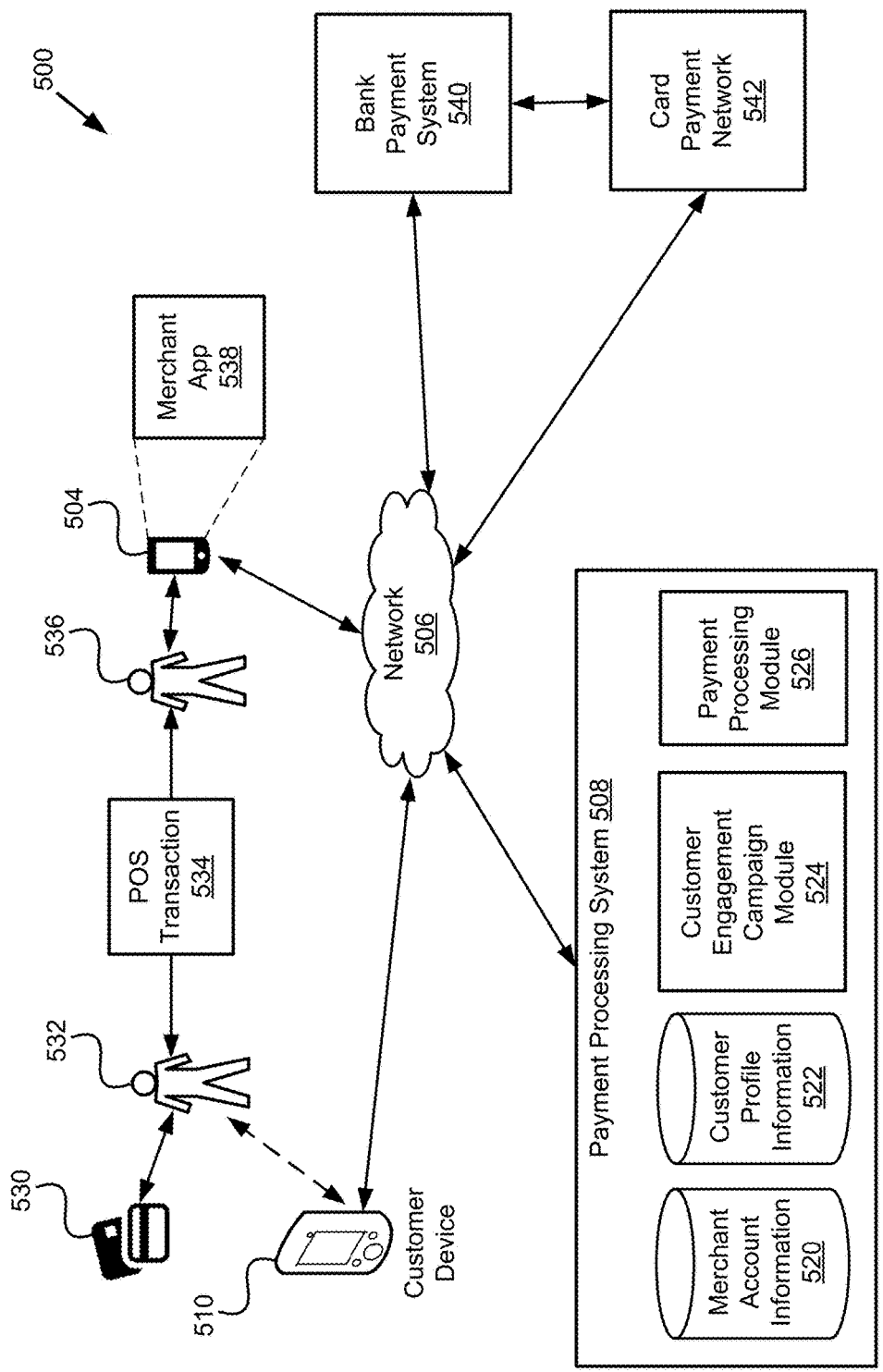
FIG. 5 illustrates an example architecture of a payment communication system for enabling transactions between merchants and customers.

At 402, the customer engagement module 524 of the payment processing system 508 (as shown in FIG. 5) receives a request to initiate a financed customer engagement campaign defining a maximum financing amount and coupons. The maximum finance amount is a cap on the actual cost of the financed customer engagement campaign and may be included in the request from the merchant. The actual costs of the financed customer engagement campaign are based on customer participation and may include a quantity and value of coupons redeemed as well as, in some instances, financing or campaign initiation fees. The maximum finance amount may include a total value of coupons at a fixed redemption rate or at a calculated redemption rate. In some instances, a calculated redemption rate may be determined based on past customer engagement campaigns of the same or similar merchants. For example, a calculated redemption rate may be determined by averaging the number and/or value of coupons redeemed by customers of merchants in the same category (e.g., fast food restaurants) and geographic area.

For the purposes of this description, a coupon may be any incentive that encourages customers to enter into transactions with a merchant, such as discounts, loyalty programs (e.g., buy 10 get one free), global discounts (e.g., sales on certain products or services or on all transactions with a merchant), and so forth. For example, the coupon (e.g., physical or virtual) may be sent to customers via e-mail, text message, mail, or other means. In some instances, using transaction information and customer profile information collected by the payment processing system 108, the financed customer engagement campaign may include sending coupons to defined customers. The defined customers may be past customers of the merchant, past customers of similar merchants, or customers known to enter into similar transactions, such as transactions for similar products or services in a similar geographic area or monetary amount. For example, if the payment processing system determines that a particular customer has purchased lunch at several food trucks in a particular location, it may allow a coupon to be sent to the customer as part of a food truck's financed customer engagement campaign.

Coupons may have various attributes such as a type of discount and a circumstance in which the coupon may be applied. A type of discount may include, for example, a fixed discount (e.g., $1), a variable discount (e.g., 10%), or other incentive (e.g., buy ten get one free). The circumstance may include, for example, effective dates during which a coupon may be redeemed. For example, coupons in a financed customer engagement campaign may have the same or staggered effective dates, which may be before, during, or after a repayment period. The interaction between the effective dates and the repayment period is described in further detail in reference to repayment below.

At 404, in some implementations, the customer engagement campaign module 524 determines eligibility of the merchant to receive financing for the financed customer engagement campaign. Eligibility may be based on the maximum finance amount and a merchant financial history. These determinations can be made, for example, by applying various machine learning techniques (e.g., ensemble learning methods).

In various implementations, the customer engagement campaign module 524 utilizes a classifier, for example, based on a random forest approach, to determine whether a merchant qualifies for campaign financing. The classifier can be trained using training data that describes, for various merchants, payment history, type of business, gross payment volume (GPV) over a particular time period, the growth of a merchant's GPV over a particular time period (e.g, month over month growth), and whether a merchant has a brick-and-mortar store, to name some examples.

To determine whether a particular merchant qualifies to receive financing for a financed customer engagement campaign, the customer engagement campaign module 524 can utilize the classifier to determine whether factors describing the merchant qualify the merchant to receive financing. As mentioned, these factors can be, for example, the merchant's payment history, the type of business, and a GPV over a particular time period (e.g., over the past fiscal quarter or year). These factors can be determined from information aggregated by the payment processing module 526 (as shown in FIG. 5), retrieved from the merchant account information 520 (as shown in FIG. 5), etc.

At 406, the customer engagement campaign module 524 may calculate the participation terms and the financing terms for the financed customer engagement campaign based on the maximum finance amount and the merchant financial history. For example, the customer engagement campaign module 524 can determine a maximum amount of financing, a fee for the financed customer engagement campaign and/or financing, and a rate for repayment (e.g., a fixed amount or a percentage, to be deducted from financial transactions conducted by the merchant). A fee may be a percentage of the amount financed, a percentage of an amount owed by the merchant (e.g., adjusted dynamically each time a coupon is redeemed or financing funds are distributed to the merchant), or a fixed fee. These calculations of the financing terms and participation terms may be made using similar techniques as to the eligibility determination. For example, the customer engagement campaign module 524 can apply normal regression analysis on the merchant's previous financial transactions conducted by the merchant through the payment processing module 526, another payment processing system, etc. to make such determinations. In some embodiments, the fee for the financing is based on a specified percentage (e.g., 14 percent) of the campaign financing. In some embodiments, the rate of repayment is a specified percentage (e.g., 10 percent). In some embodiments, the rate is determined based on targeting a 10-month repayment model. This model can be determined by forecasting the merchant's GPV for the subsequent year.

The participation terms include a transaction redemption amount that offsets a discount given by the merchant for a transaction during the financed customer engagement campaign such that the actual costs of the financed customer engagement campaign are delayed for the merchant. The participation terms may include the types of customer incentives and how they are distributed and redeemed. For example, the participation terms may specify that a coupon is worth a fixed amount (e.g., $1) or is determined during the processing of each transaction (e.g., 10% discount). Therefore, a transaction redemption amount may be a dynamic value determined based on the amount of a transaction.

The financing terms include interest rates or fees (e.g., a fixed or variable cost to set up a financed customer engagement campaign) and repayment terms. The repayment terms are terms according to which repayment for the financing of the financed customer engagement campaign are collected, including an amount, method, and/or time period of repayment. In some implementations, the repayment methods include a percentage of each transaction processed by the payment processing module 526 for the merchant to be withheld for repayment of the actual costs of the financed customer engagement campaign. In some implementations, the repayment method includes a recurring or periodic fee.

The repayment period is a range of dates during which repayment is collected. In some implementations, the repayment period may commence after the last coupon is redeemed or expires, with the effective dates of the coupons, or at some other time period (e.g., before coupons are effective) specified by the merchant or calculated by the customer engagement campaign module 524. In some implementations, the end of the repayment period may be a fixed date (e.g., 10 months) from the commencement of the repayment period and repayment amounts are calculated based on that date. In some implementations, the end of the repayment period may be a dynamic date that is adjusted based on a total transaction redemption amount and an amount repaid by the merchant. For example, if the merchant repays the financing at a different rate than projected, the end of the repayment period may be adjusted accordingly.

In some implementations, the repayment period may overlap with the effective dates of the coupons, in which case either the repayment amount collected from the merchant's transactions or the transaction redemption amount may be adjusted so that funds are net settled, as described below. If the repayment period is concurrent with at least a portion of the effective dates of the coupons, the repayment amount or transaction redemption amount may be dynamically adjusted based on the value and redemption date of each coupon, as discussed below.

The repayment amount may be a fixed quantity or percentage of transactions or dynamically determined amount collected via the repayment method over a repayment period. The repayment amount may be an amount deducted from each transaction, deducted from a net settlement at the end of a merchant payment period, or repaid by the merchant periodically over the repayment period.

In some implementations, the repayment amount is a set amount based on an assumed 100 percent redemption rate (e.g., the value of all of the coupons issued is assumed to be redeemed). For example, if the repayment period is 10 months, the maximum finance amount is $1000, and the total financing fees are $100, then the merchant would repay $1100 over 10 months. If the actual redemption rate is less than the assumed 100 percent, then the repayment could be reconciled (e.g., through early termination of the repayment period, refund of excess collected funds, etc.).

In some implementations, the repayment amount is a set amount based on an actual redemption rate. For instance, the repayment period would begin after redemption or expiration of all coupons so that the repayment amount could be accurately calculated and then collected based on the actual redemption rate. For example, if the repayment period is 10 months, the maximum finance amount is $1000, the actual redemption rate is 60 percent, and the total financing fees are $100, then the merchant would repay $700 over 10 months.

In some implementations, the repayment amount is a set amount based on a calculated redemption rate. For instance, if the customer engagement campaign module 524 calculates that it is expected that there will be a particular redemption rate, repayment would be collected based on the calculated redemption rate. For example, if the repayment period is 10 months, the maximum finance amount is $1000, the calculated redemption rate is 90 percent, and the total financing fees are $100, then the merchant would repay $1000 over 10 months. If the actual redemption rate is different than the assumed redemption rate, then the repayment could be reconciled (e.g., through early termination of the repayment period, extension of the repayment period, refund of excess collected funds, etc.).

In some implementations, the repayment amount is a dynamically determined amount based on the redemption rate of coupons. For instance, a rate of redemption at one or more instances may be extrapolated throughout the financed customer engagement campaign (e.g., the effective dates of the coupons) to determine a calculated redemption rate. For example, if during the first 20 percent of the financed customer engagement campaign 10 percent of coupons are redeemed, the customer engagement campaign module 524 may calculate that the redemption rate will probably be 50 percent, so the repayment is collected based on a 50 percent redemption rate. If, subsequent to the calculation of the redemption rate, the actual redemption rate changes, the extrapolated redemption rate may be adjusted.

In some implementations, the repayment amount is a dynamically determined amount based on the actual redemption of coupons. For instance, each time a coupon is redeemed, the transaction redemption amount for that transaction may be spread over the repayment period. For example, if the repayment period is 100 days and on day one $100 of coupons are redeemed, repayment for the $100 of coupons would be spread over the 100 days (e.g., $1 per day). If, on the second day of the 100 day repayment period, an additional $100 of coupons are redeemed, repayment for the additional $100 of coupons would be spread over the remaining 99 days (e.g., $1.01 per day for a total of $2.01 per day over the remaining 99 days). It should be noted that, the repayment amount for the transactions may be distributed over the repayment period in any manner (e.g., the repayment amount may be distributed so that the amount repaid by the merchant is relatively equal over the repayment period).

In some implementations, the payment processing module 526 may determine whether a coupon was used in a particular transaction before withholding repayment for that transaction. For example, more repayment may be withheld from those transactions in which a coupon was used than those transactions in which no coupon was used. By withholding additional repayment from those transactions driven by the financed customer engagement campaign in circumstances where a merchant's sales increase significantly, the merchant's revenue would increase less significantly, but the repayment would be collected when the merchant is most able to support the repayment financially. Additionally, the risk that the merchant will be unable to pay off the financing is mitigated if the merchant's transactions drop off after the end of the financed customer engagement campaign.

It should be understood that although the above descriptions of variable repayment amounts are described in terms of repayment, they may alternatively be applicable to the amount of financed funds provided to cover the cost of the coupon (e.g., the transaction redemption amount). Rather than adjusting the repayment amount, a transaction redemption amount may be adjusted or otherwise net settled. For example, if the value of a coupon redeemed on a certain transaction is $1.00, but repayment owed by the merchant for that transaction is $0.30, then the transaction redemption amount for that transaction would be $0.70. In another example, if the effective date of a coupon is on the last day of the repayment period or if the coupon is redeemed after the end of the repayment period, none of the value of the coupon may be financed.

At 408, the customer engagement campaign module 524 transmits the financing terms and the participation terms to the merchant and, at 410, the customer engagement module 524 receives an acceptance of the financing terms and the participation terms from the merchant.

At 412, the payment processing module 526 of the payment processing system 508 (as shown in FIG. 5) processes transactions during the financed customer engagement campaign including finding and applying a virtual coupon. Processing transactions is described in further detail in reference to FIG. 5. Finding and applying a virtual coupon is described in further detail in reference to FIGS. 1-3.

At 414, the payment processing module 526 deposits a net settlement in an account associated with the merchant. A net settlement is a resolution of all of the credits and debits to a merchant during a merchant payment period. The net settlement may be based on a payment amount, a transaction redemption amount, and a repayment amount. A merchant may be paid on a per transaction basis, on a per day basis, or according to some other payment schedule where the funds for the merchant for that payment period may be net settled. Credits may include payment amounts from customers for one or more transactions, financed funds to cover the transaction redemption amount (e.g., all or a portion of a discount as part of the financed customer engagement campaign), and so forth. Debits may include due repayment amounts, transaction fees, and so forth.

In some implementations, the payment processing module 526 deposits a payment amount for the transaction and the transaction redemption amount in an account associated with the merchant during the financed customer engagement campaign and then, during the repayment period, withholds a percentage of each transaction processed for the merchant by the payment processing system for repayment of a portion of the actual costs of the financed customer engagement campaign.

Repayment may be collected periodically or from each transaction processed by the payment processing system as specified by the repayment terms. During the repayment period, the payment processing module 526 may withhold a percentage of each transaction processed for the merchant by the payment processing system for repayment of a portion of the actual costs of the financed customer engagement campaign. For example, the payment processing module 526 may debit a certain amount (e.g., 5%, 50 cents, etc.) from the merchants funds for each transaction, such that the campaign financing is repaid directly from the merchant's proceeds before they are received by the merchant rather than waiting for repayment from the merchant, thereby decreasing the risk associated with the financing.

FIG. 5 illustrates an example architecture of a payment communication system 500 for enabling transactions between merchants 536 and customers 532. In the example of FIG. 5, a customer 532 may use any of a variety of payment cards 530 when participating in a POS transaction 534 with a merchant 536. For example, a customer 532 may typically have payment cards 530 such as credit cards, debit cards, prepaid cards, and the like, that the customer 532 may use for conducting POS transaction 534. In some implementations, the payment cards 530 may include one or more magnetic strips for providing payment card and customer information when swiped in a payment card reader 730 (e.g., as discussed in reference to FIG. 7). In other implementations, other types of payment cards may be used, for example smart cards having a built-in integrated circuit including a memory chip, a radio frequency identification tag, and the like. In some implementations, card-less payment methods may be used. For example, a virtual payment card may be stored on a user device such as a smart phone or other device and transmittable via near field communication or other suitable means.

The payment communication system 500 in the example of FIG. 5 illustrates a merchant device 504 associated with the merchant 536 that participates in the payment service provided by the service provider of the payment processing system 508. As discussed elsewhere herein, the merchant device 504 may be a computing device (e.g., a mobile computing device or user device) able to communicate with the payment processing system 508, and with various other computing devices, through suitable communication protocols, interfaces, and networks, including network 506. Further, the merchant device 504 may be any appropriate device operable to send and receive requests, messages, or other types of information over the network 506. Additionally, while only a single merchant device 504 is illustrated in the example of FIG. 5, in some implementations there may be additional merchant devices depending on the number of merchants participating in the payment service.

Each merchant device 504 may include an instance of a merchant application 538 executed on the merchant device. The merchant application 538 may provide POS functionality to enable the merchant 536 to accept payments at a POS location using the merchant device 504. The merchant application 538 on the merchant device 504 may send transaction information via data network 506 (e.g., the internet) to the payment processing system 508, for example, while the transaction is being conducted at the POS location. For example, the merchant application 538 may be a register application that receives an input from the merchant indicating a product or service for purchase by the customer and that receives payment card information from a payment card reader coupled with a mobile POS terminal to facilitate a transfer of funds from the customer to the merchant. A mobile POS terminal may include a merchant device 504, a payment card reader, and one or more other components as described herein.

In some types of businesses, the POS location may correspond to a store or other place of business of the merchant, and thus, may be a fixed location that typically does not change on a day-to-day basis. In other types of businesses, however, the POS location may change from time to time, such as in the case that the merchant 536 operates a food truck, is a street vendor, a cab driver, or has an otherwise mobile business, for example, in the case of merchants who sell items at customers' homes, customers' places of business, and so forth.

Accordingly, the merchant 536 and the customer 532 may conduct a POS transaction 534 by which the customer 532 acquires an item or service from the merchant 536 at a POS location. The merchant application 538 on the merchant device 504 may send transaction information to the payment processing system 508, for example, as the transaction is being conducted at the POS location. In some implementations, such as if a particular merchant device 504 is not connected to the network 506 and is therefore processing transactions offline, the transaction information may be sent in a batch at a subsequent point in time or using other suitable techniques. In some implementations, the transaction information may be sent via SMS, MMS, or a voice call.

The transaction information may include information regarding the time, place, and the amount of each respective transaction, information related to the item or service acquired, payment card information, as well as additional information, such as customer information. For instance, the transaction information can include data stored in the payment card, such as magnetic stripe or integrated circuit data (e.g., cardholder name, card number, and other card information). In addition, when completing the transaction a customer may sometimes provide a receipt e-mail address for receiving an interactive digital receipt through e-mail, a phone number for receiving a receipt via text message, a user name for receiving the receipt via an interactive receipt application, etc. Other examples of transaction information that can be captured include detailed item information, for example, an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant (e.g., a merchant identifier, a merchant category code (MCC)), data describing a customer, any type of data that is received upon a customer's authentication into a social network, if any, and various other types of information.

To accept electronic payments for POS transactions, the merchant 536 typically creates a merchant account with the payment processing system 508 by providing information describing the merchant including, for example, merchant name, contact information (e.g., telephone numbers, the merchant's address, and one or more financial accounts to which funds collected from customers will be deposited). This merchant information can be securely stored by the service provider, for example, as merchant account information 520 in a secure database. Further, the merchant information may include a merchant profile created for each merchant. The merchant profile may include information about the merchant 536 and transaction information associated with transactions conducted by the merchant.

A customer may create a customer profile by creating an account with the payment processing system 508 or by merely using a payment card in a transaction processed by the payment processing system 508. After a customer profile has been created, the customer may modify the customer's profile by providing information describing the customer, for example, customer name, contact information, payment information, etc. The customer profile may be stored by the service provider, for example, as customer profile information 522 in a secure database.

The secure databases that store the merchant account information 520 and customer profile information 522 may include data storage devices (e.g., a non-transitory computer-readable medium) for storing and providing access to data. The data stored by the data storage devices may be organized and queried using various criteria including stored data types and may include data tables, databases, or other organized collections of data. The components of the payment processing system 508 may be communicatively coupled to the data storage device and may access (e.g., read, write, modify, delete, etc.) the data stored therein.

The merchant account information 520 and/or customer profile information 522 stored in the data storage devices may include financial account information (e.g., routing number for a checking account, payment card numbers, balance, etc.), financial history, geographical location information, customer information, merchant information, etc. Financial history may include financial transaction data, account balance data, repayment history, financed customer engagement campaign history, merchant attribute data, customer attribute data, and other types of data, which are contemplated herein. For example, financial transaction data may include a history (frequency, amount, regularity, location, etc.) of financial transactions processed through the payment processing system 508, etc. Merchant attribute data may include the type of merchant (taxi service, food cart, retail store) associated with transactions, whether the merchant has a brick-and-mortar store, etc.

The payment processing system 508 enables a service provider to provide a payment service in which merchants 536 are able to conduct POS transactions 534 with a plurality of customers 536, such as for selling services and/or products to the customers 536. The payment processing system 508 may include one or more servers that are configured to process secure electronic financial transactions, for example, payment during a POS transaction 534, by communicating with the merchant device 504, card payment networks 542, and bank or other financial institution payment systems 540. The payment processing system 508 includes a payment processing module 526 that receives transaction information for processing payments made through the merchant application 538. For example, the payment processing module 526 may receive transaction information, such as an amount of the transaction, and may verify that a particular payment card 530 can be used to pay for the transaction, such as by contacting a card clearinghouse of a card payment network 542. Furthermore, in some examples, the payment processing module 526 may redirect payment information for transactions to be made using payment cards 530 to a bank, or other financial institution, payment system 540. In other implementations, the merchant device 504 may communicate directly with an appropriate card payment network 542 or bank payment system 540 for approving or denying a transaction using a particular payment card 530 for a POS transaction 534. Additional details of payment processing are discussed below.

The payment processing system 508 includes a customer engagement campaign module 524 for implementing a financed customer engagement campaign and financing therefor according to the techniques described herein.

The customer device 510 may include any user computer device with which the customer 532 interacts to receive information, such as an interactive digital receipt. The customer device 510 may include a memory, processor, communication interface, and other components as described in reference to the merchant device 504 in FIG. 7. For example, the customer device may include a personal computer, tablet, mobile phone, smart phone, smart watch or other wearable device, etc.

As introduced above, the payment processing system 508 may be configured to communicate with one or more systems of a card payment network 542 (e.g., MasterCard®, VISA®, or the like) over the network 506 to conduct financial transactions electronically. The payment processing system 508 may also communicate with one or more bank payment systems 540 of one or more banks over the network 506. For example, the payment processing system 508 may communicate with an acquiring bank, a payment card issuing bank, and/or a bank maintaining customer accounts for electronic payments.

A payment card acquiring bank may be a registered member of a card association (e.g., Visa®, MasterCard®, or the like), and may be part of a card payment network 542. A payment card issuing bank may issue payment cards 530 to customers 536, and may pay acquiring banks for purchases made by cardholders to which the issuing bank has issued a payment card 530. Accordingly, in some implementations, the systems of an acquiring bank may be included in the card payment network 542 and may communicate with systems of a payment card issuing bank to obtain payment. Further, in some implementations, bank payment systems 540 may include systems associated with debit card issuing institutions, in which case, the systems of the debit card issuing institution may receive communications regarding a transaction in which the customer uses a debit card instead of a credit card. Additionally, there may be systems of other financial institutions involved in some types of transactions or in alternative system architectures, and thus, the foregoing are merely several examples.

The network 506 can be a conventional type, wired or wireless, and may have numerous different configurations including a star configuration, token ring configuration, or other configurations. Furthermore, the network 506 may include a local area network (LAN), a wide area network (WAN) (e.g., the internet), and/or other interconnected data paths across which multiple devices may communicate. In some implementations, the network 506 may be a peer-to-peer network. The network 506 may also be coupled with or include portions of a telecommunications network for sending data using a variety of different communication protocols. In some implementations, the network 506 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, e-mail, etc. Although the example of FIG. 5 illustrates one network 506 coupled to the merchant device, customer device, payment processing system, card payment network, and bank, in practice one or more networks 506 can connect these entities.

Figure 6:
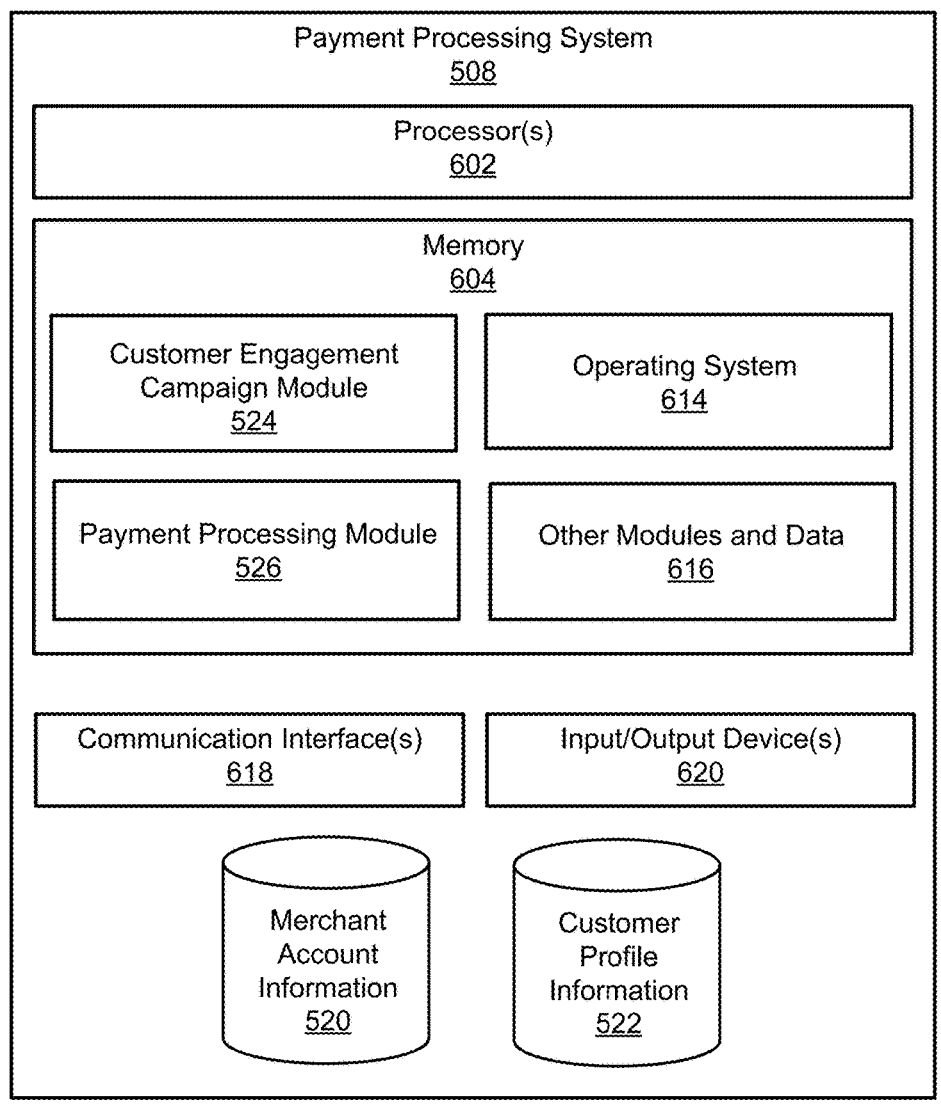
FIG. 6 illustrates an example block diagram of components of a payment processing system.

FIG. 6 is a block diagram 600 illustrating select components of an example payment processing system 508 according to some implementations. The payment processing system 508 may be any suitable type of computing device capable of sending communications and performing functions according to the techniques described herein and may be operated by a service provider that provides the payment processing service. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 508 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 508. Multiple payment processing systems 508 may be located together or separately, and organized, for example, as virtual servers, server banks and/or server farms. The described functionality may be provided by the servers of a single entity or enterprise, or may be provided by the servers and/or services of multiple different customers or enterprises.

In the example of FIG. 6, the payment processing system 508 includes one or more processors 602, one or more memory devices 604, one or more communication interfaces 618, and one or more input/output devices 620. These components may be similar to those described with reference to FIG. 7 and elsewhere herein.

The memory 504 may be used to store and maintain any number of functional components or modules that are executable by the processor 602. In some implementations, these functional components comprise instructions or programs that are executable by the processor 602 and that, when executed, implement operational logic for performing the actions and services attributed above to the payment processing system 508. Functional components of the payment processing system 508 stored in the memory 504 may include the customer engagement campaign module 524, the payment processing module 526, the operating system 614, and other modules and data 616. These components may be similar to those described with reference to FIG. 5 and elsewhere herein. In addition, the memory 604 may store data used for performing the operations described herein. Thus, the memory 604 may store merchant information 520, including the merchant profiles and customer profile information 522, including customer profiles. Further, the payment processing system 508 may include many other logical, programmatic and physical components, of which those described above are merely examples that are related to the discussion herein.

Figure 7:
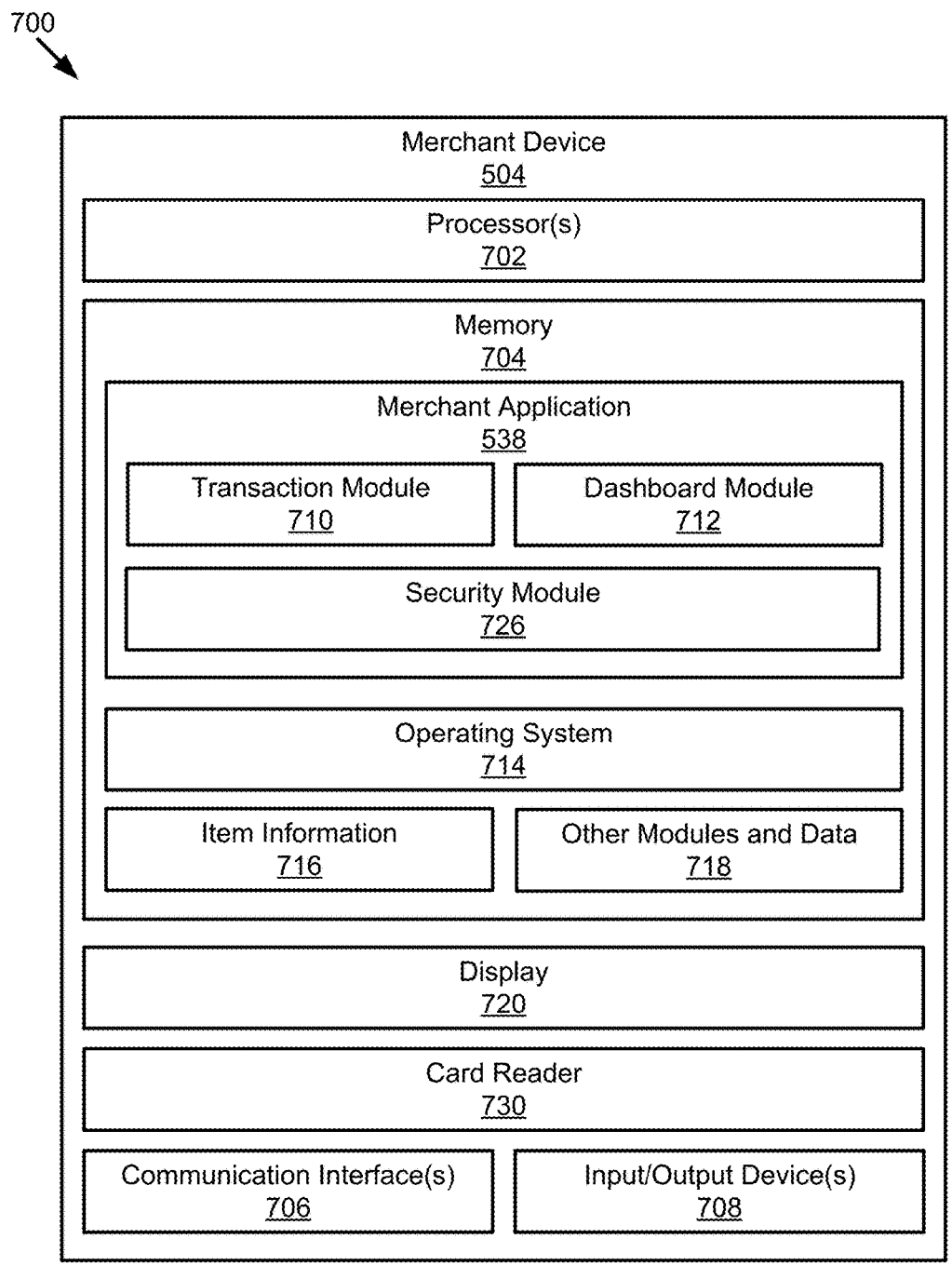
FIG. 7 illustrates an example block diagram of components of a merchant device.

FIG. 7 is a block diagram 700 illustrating select components of an example merchant device 504 according to some implementations. The merchant device 504 may be any suitable type of user computing device (e.g., portable, semi-portable, semi-stationary, or stationary). Some examples of the merchant device 504 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 7, the merchant device 504 includes at least one processor 702, a memory 704, one or more communication interfaces 706, and one or more input/output (I/O) devices 708. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some implementations, the processor 702 may be one or more hardware processors and/or logic circuits of any suitable type specifically programmed or configured to execute the algorithms and processes described herein by performing various input/output, logical, and/or mathematical operations. The processor 702 can be configured to fetch and execute computer-readable processor-executable instructions stored in the memory 704.

Depending on the configuration of the merchant device 504, the memory 704 may be an example of tangible non-transitory computer storage media (e.g., computer-readable media) and may include volatile and nonvolatile memory and/or removable and non-removable media implemented in any type of technology for storage of information such as computer-readable processor-executable instructions, data structures, program modules or other data. The computer-readable media may include, but is not limited to, RAM, ROM, EEPROM, flash memory, solid-state storage, magnetic disk storage, optical storage, and/or other computer-readable media technology. Further, in some cases, the merchant device 504 may access external storage, such as RAID storage systems, storage arrays, network attached storage, storage area networks, cloud storage, or any other medium that can be used to store information and that can be accessed by the processor 702 directly or through another computing device or network. Accordingly, the memory 704 may be computer storage media able to store instructions, modules or components that may be executed by the processor 702.

The memory 704 may be used to store and maintain any number of functional components or modules that are executable by the processor 702. In some implementations, these functional components comprise instructions or programs that are executable by the processor 702 and that, when executed, implement operational logic for performing the actions and services attributed above to the merchant device 504. Functional components of the merchant device 504 stored in the memory 704 may include the merchant application 538. In this example, the merchant application 538 includes a transaction module 710, a dashboard module 712, and a security module 726, although the merchant application 538 may also contain modules or portions of modules assigned herein to the payment processing system 508. The transaction module 710, for example, presents an interface, such as a payment interface to enable the merchant to conduct transactions, receive payments, and so forth, as well as for communicating with the payment processing system 508 for processing payments and sending transaction information. The dashboard module 712 enables the merchant to manage the merchant's account, the merchant profile, merchant preferences, view saved or new pricing information, communicate with the payment processing system 508 regarding the implementation, financing, and administration of the financed customer engagement campaign. The security module 726 may, as described herein, enable the merchant application 538 to encrypt and decrypt transaction information communicated between the merchant device 504 and other system components. Additional functional components may include an operating system 714 for controlling and managing various functions of the merchant device 504 and for enabling basic user interactions with the merchant device 504.

In addition, the memory 704 may also store data, data structures and the like, that are used by the functional components. For example, data stored by the memory 704 may include item information 716 that includes information about the items offered by the merchant, which may include a list of items currently available from the merchant, images of the items, descriptions of the items, prices of the items, and so forth. For instance, when the merchant 536 is setting up the merchant application 538 to accept payments for particular items offered by the merchant 536, the merchant may enter the item information 716 for the particular items.

Depending on the type of the merchant device 504, the memory 704 may also optionally include other functional components and data, such as other modules and data 718, which may include programs, drivers, etc., and the data used or generated by the functional components. Further, the merchant device 504 may include many other logical, programmatic and physical components, of which those described are merely examples that are related to the discussion herein.

The communication interface(s) 706 may include one or more interfaces and hardware components for enabling communication with various other devices, such as over the network(s) 506 or directly. For example, communication interface(s) 706 may enable communication through one or more of the internet, cable networks, wireless networks (e.g., Wi-Fi) and wired networks, as well as close-range communications such as Bluetooth®, Bluetooth® low energy, and the like.

In another implementation, the communication interface(s) 706 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 706 also provides other conventional connections to the network 506 for distribution of files and/or media objects using standard network protocols such as TCP/IP, HTTP, HTTPS and SMTP as will be understood.

The merchant device 504 may further include a display 720, which may employ any suitable display technology. For example, the display 720 may be a liquid crystal display, a plasma display, a light emitting diode display, an OLED (organic light-emitting diode) display, an electronic paper display, or any other suitable type of display able to present digital content thereon. In some implementations, the display 720 may have a touch sensor associated with the display 720 to provide a touchscreen display configured to receive touch inputs for enabling interaction with a graphical user interface presented on the display 720. Accordingly, implementations described herein are not limited to any particular display technology. Alternatively, in some implementations, the merchant device 504 may not include the display 720, and information may be presented by other means, such as aurally.

The merchant device 504 may further include one or more I/O devices 708. The I/O devices 708 may include speakers, a microphone, a camera, and various user controls (e.g., buttons, a joystick, a keyboard, a keypad, etc.), a haptic output device, and so forth.

In addition, the merchant device 504 may include or may be connectable to a payment card reader 730. In some implementations, the payment card reader 730 may plug in to a port in the merchant device, such as a microphone/headphone port, a data port, or other suitable port. The payment card reader 730 may include a card interface for reading a magnetic stripe or an integrated circuit of a payment card 530, and further may include encryption technology for encrypting the information read from the payment card 530. Alternatively, numerous other types of payment card readers 730 may be employed with the merchant devices 504 herein, depending on the type and configuration of the merchant device 504.

As used here, the term "payment card" or "payment instrument" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms. In some implementations, a payment card or payment instrument may also include a virtual payment card stored on a user device such as a smart phone, smart watch, or other device and transmittable, for example, via near field communication or other suitable means.

Other components included in the merchant device 504 may include various types of sensors (not shown), which may include a GPS device, an accelerometer, gyroscope, compass, proximity sensor, and the like. Additionally, the merchant device 504 may include various other components that are not shown, examples of which include removable storage, a power source, such as a battery and power control unit, and so forth.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one implementation above primarily with reference to software and particular hardware. However, the techniques may be implemented using any type of computing system that can receive data and commands, and present information as part of any peripheral device providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Furthermore, the techniques introduced herein can be embodied in the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

Finally, the algorithms presented herein are not inherently related to any particular computer or other apparatus. Various general-purpose systems may be used with programs in accordance with the teachings herein, or it may prove convenient to construct more specialized apparatus to perform the required method steps. In addition, the techniques introduced herein are not described with reference to any particular programming language. It will be appreciated that a variety of programming languages may be used to implement the techniques as described herein.

The foregoing description of the implementations has been presented for the purposes of illustration and description. It is not intended to be exhaustive or to limit the techniques to the precise form disclosed. Many modifications and variations are possible in light of the above teaching. It is not intended that the scope of the implementations be limited by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, or similar components known to those of ordinary skill in the art of computer programming. Additionally, the techniques are in no way limited to implementation in any specific programming language, or for any specific operating system or environment. Accordingly, the detailed description is intended to be illustrative, but not limiting, of the scope of the claims, which are set forth below.

What is claimed is:

1. A computer-implemented method comprising:

receiving, by a payment processing system, a request from a merchant device associated with a merchant to initiate a financed customer engagement campaign having a maximum finance amount, wherein the maximum finance amount is a cap on costs to the merchant of the financed customer engagement campaign and the costs to the merchant of the financed customer engagement campaign are based on customer participation;

determining, by the payment processing system, eligibility of the merchant to obtain financing for the financed customer engagement campaign based on the maximum finance amount and a merchant financial history including an amount collected by the merchant from previous financial transactions processed through the payment processing system;

calculating, by the payment processing system, participation terms and financing terms, the financing terms including a financed customer engagement campaign fee and repayment terms based on the maximum finance amount and the merchant financial history, the participation terms including a transaction redemption amount, wherein the transaction redemption amount offsets a discount given by the merchant for a transaction during the financed customer engagement campaign such that the costs to the merchant of the financed customer engagement campaign are delayed for the merchant, and the repayment terms including a percentage of each transaction processed by the payment processing system for the merchant to be withheld for repayment of the costs to the merchant of the financed customer engagement campaign;

transmitting, by the payment processing system, the participation terms and the financing terms to the merchant device;

receiving, by the payment processing system, an acceptance of the participation terms and financing terms from the merchant device;

processing, by the payment processing system, a plurality of transactions between the merchant and customers based on transaction information received via the merchant device during the financed customer engagement campaign;

for each transaction of the plurality of transactions processed by the payment processing system for the merchant, tracking an amount of the discount given by the merchant to a respective customer for the transaction and a payment amount received from the respective customer;

depositing, by the payment processing system, a payment amount received from the respective customer for each transaction and the transaction redemption amount in an account associated with the merchant determined for each transaction based on the discount given by the merchant for each transaction; and withholding, by the payment processing system, the percentage of each transaction processed for the merchant by the payment processing system for repayment of a portion of the costs to the merchant of the financed customer engagement campaign.

2. The method of claim 1, further comprising:

determining whether a virtual coupon is linked with a payment card of the respective customer;

determining the discount based on the virtual coupon; and deducting the discount from the processed transaction.

3. The method of claim 1, wherein the transaction redemption amount is adjusted dynamically based on the discount and the repayment terms.

4. The method of claim 1, wherein the repayment terms specify that the percentage of each transaction withheld is based on the maximum finance amount, the merchant financial history, and a repayment period.

5. A computer-implemented method comprising:
receiving, by a payment processing system, a request from a merchant device associated with a merchant to initiate a financed customer engagement campaign, wherein costs to the merchant of the financed customer engagement campaign are based on customer participation;
calculating, by the payment processing system, participation terms and financing terms, the financing terms including repayment terms, the participation terms including a transaction redemption amount, wherein the transaction redemption amount offsets a discount given by the merchant for a transaction during the financed customer engagement campaign such that the costs to the merchant of the financed customer engagement campaign are delayed for the merchant;
processing, by the payment processing system, a plurality of transactions between the merchant and customers based on transaction information received via the merchant device during the financed customer engagement campaign;
for each transaction of the plurality of transactions processed by the payment processing system for the merchant, tracking an amount of the discount given by the merchant to a respective customer for the transaction and a payment amount received from the respective customer; and
depositing, by the payment processing system, a net settlement amount in an account associated with the merchant, the net settlement amount based on the payment amount received from the respective customer for each transaction and the transaction redemption amount determined for each transaction based on the discount given by the merchant for each transaction.

6. The method of claim 5, wherein processing a transaction of the plurality of transactions during the financed customer engagement campaign includes:
determining whether a virtual coupon is linked with a payment card of the respective customer;
determining the discount based on the virtual coupon; and
deducting the discount from the processed transaction.

7. The method of claim 6, further comprising:
issuing virtual coupons to a plurality of the customers, the plurality of customers including the respective customer; and
linking a virtual coupon of the virtual coupons to a payment card of the respective customer.

8. The method of claim 5, wherein the transaction redemption amount is a variable amount based on an amount of the transaction.

9. The method of claim 5, wherein the net settlement amount is dynamically adjusted based on a remaining repayment term.

10. The method of claim 5, wherein calculating the financing terms includes evaluating past transactions processed for the merchant by the payment processing system.

11. The method of claim 5, wherein depositing the net settlement amount in the account associated with the merchant is in response to a redemption of a coupon by the respective customer.

12. The method of claim 11, further comprising dynamically adjusting, by the payment processing system, a repayment amount based on a value of the coupon and a remaining repayment period.

13. The method of claim 5, further comprising withholding a percentage of each transaction processed for the merchant by the payment processing system for repayment of a portion of the costs to the merchant of the financed customer engagement campaign.

14. A payment processing system comprising:
a processor; and
a memory storing instructions that, when executed by the computer processor, cause the computer processor to perform operations including:
receiving a request from a merchant device associated with a merchant to initiate a financed customer engagement campaign, wherein costs to the merchant of the financed customer engagement campaign are based on customer participation;
calculating participation terms and financing terms, the financing terms including repayment terms, the participation terms including a transaction redemption amount, wherein the transaction redemption amount offsets a discount given by the merchant for a transaction during the financed customer engagement campaign such that the costs to the merchant of the financed customer engagement campaign are delayed for the merchant;
processing a plurality of transactions between the merchant and customers based on transaction information received via the merchant device during the financed customer engagement campaign;
for each transaction of the plurality of transactions processed by the payment processing system for the merchant, tracking an amount of the discount given by the merchant to a respective customer for the transaction and a payment amount received from the respective customer; and
depositing a net settlement amount in an account associated with the merchant, the net settlement amount based on the payment amount received from the respective customer for each transaction and the transaction redemption amount determined for each transaction based on the discount given by the merchant for each transaction.

15. The payment processing system of claim 14, wherein to process a transaction of the plurality of transactions during the financed customer engagement campaign includes:
determining whether a virtual coupon is linked with a payment card of the respective customer;
determining the discount based on the virtual coupon; and
deducting the discount from the processed transaction.

16. The payment processing system of claim 15, wherein the operations further comprise:
issuing virtual coupons to a plurality of the customers, the plurality of customers including the respective customer; and
linking a virtual coupon of the virtual coupons to a payment card of the respective customer.

17. The payment processing system of claim 14, wherein the transaction redemption amount is a variable amount based on an amount of the transaction.

18. The payment processing system of claim 14, wherein the net settlement amount is dynamically adjusted based on a remaining repayment term.

19. The payment processing system of claim 14, wherein calculating the financing terms includes evaluating past transactions processed for the merchant by the payment processing system.

20. The payment processing system of claim 14, wherein depositing the net settlement amount in the account associated with the merchant is in response to a redemption of a coupon by the respective customer.

21. The payment processing system of claim 14, wherein the operations further comprise dynamically adjusting a repayment amount based on a value of a coupon and a remaining repayment period.

22. The payment processing system of claim 14, wherein the operations further comprise withholding a percentage of each transaction processed for the merchant by the payment processing system for repayment of a portion of the costs to the merchant of the financed customer engagement campaign.

\* \* \* \* \*